(12) United States Patent
Junnan et al.

(10) Patent No.: US 6,933,688 B2
(45) Date of Patent: Aug. 23, 2005

(54) BRUSHLESS DIRECT CURRENT MONOPHASE MOTOR DRIVE CIRCUIT

(75) Inventors: Xi Junnan, Miyota-Machi (JP); Mitsuo Konno, Miyota-Machi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/439,905

(22) Filed: May 16, 2003

(65) Prior Publication Data

US 2004/0004453 A1 Jan. 8, 2004

(30) Foreign Application Priority Data

May 23, 2002 (JP) ........................................ 2002-149204

(51) Int. Cl.$^7$ ............................................. H02P 5/168
(52) U.S. Cl. ...................... 318/138; 318/254; 318/439; 318/720
(58) Field of Search ................................ 318/280, 254, 318/138, 375, 439, 376, 720–724; 257/107, 111

(56) References Cited

U.S. PATENT DOCUMENTS

| | | | |
|---|---|---|---|
| 4,755,728 A | * | 7/1988 | Ban ........................... 318/254 |
| 5,075,608 A | * | 12/1991 | Erdman et al. ............. 318/599 |
| 5,376,866 A | * | 12/1994 | Erdman ...................... 318/254 |
| 5,859,519 A | * | 1/1999 | Archer ........................ 318/801 |
| 6,078,154 A | * | 6/2000 | Manlove et al. ............. 318/293 |
| 6,185,118 B1 | * | 2/2001 | Sander et al. ............... 363/132 |
| 6,664,750 B2 | * | 12/2003 | Pelonis ....................... 318/439 |
| 6,713,979 B2 | * | 3/2004 | Naito et al. ................. 318/280 |

FOREIGN PATENT DOCUMENTS

JP 2001037276 A * 2/2001 ........... H02P/5/168

* cited by examiner

*Primary Examiner*—David Martin
*Assistant Examiner*—Eduardo Colon Santana
(74) *Attorney, Agent, or Firm*—Joel Lutzker; Anna Vishev; Schulte Roth & Zabel LLP

(57) ABSTRACT

A brushless direct current motor drive circuit having a serially connected motor coil energizing circuit, a serially connected feedback circuit, a pre-drive circuit, a position sensor, and a duty ratio controller. This circuit can decrease the heat generation from the switching elements on the power source side, perform absorption of the current flowing back in the direction of the switching elements on the power source side when the duty ratio is set to less than 100% without using an electrolytic capacitor group that causes a shortening of the motor lifetime, and solve various problems caused by the use of an electrolytic capacitor group.

2 Claims, 3 Drawing Sheets

PRIOR ART

US 6,933,688 B2

BRUSHLESS DIRECT CURRENT MONOPHASE MOTOR DRIVE CIRCUIT

CROSS-REFERENCE TO RELATED APPLICATIONS

This application claims all rights of priority to Japanese Patent Application No. 2002-149204 (pending).

BACKGROUND OF THE INVENTION

1. Field of the Invention

The present invention relates to a brushless direct current monophasic motor, and more particularly to a drive circuit thereof.

2. Description of the Related Art

In office automation equipment such as personal computers or photocopiers, a number of electronic devices have electronic components, which are contained in a relatively narrow housing. There is a concern that the heat generated from the above-mentioned electronic components is confined in the housing and destroys the electronic components by heat. Therefore, air vents are made and a fan motor is mounted to the air vent to evacuate the heat from inside the housing to the outside.

For this purpose, it is not uncommon to use a brushless direct current monophase motor. FIG. 3 describes a drive circuit of the past for such a brushless direct current monophasic motor.

In this figure, +B represents the direct current power source to drive a brushless direct current monophase motor coil (motor coil) L.

The drive circuit is constituted by mounting 4 switching elements, here, MOS type power FETs (field-effect transistors) Q1–Q4, a diode D1 and an electrolytic capacitor group 31.

The DC—DC converter 34 is a voltage conversion circuit that supplies a direct current power source, which is below the voltage of the direct current source +B, to a pre-drive circuit 35.

The pre-drive circuit 35 is a circuit that receives signals from a motor rotation position detector 36 and a duty ratio controller in PWM (pulse width modulation), supplies suitably set gate signals GS1–GS4 to FETs Q1–Q4, and controls their ON/OFF states. In addition, 32 is a fuse, and 33 is a filter circuit.

The motor coil L is mounted on the stator of the motor (not shown) and energized by the FETs Q1–Q4 with a prescribed ON/OFF timing, to generate a dynamic magnetic field (rotating magnetic field).

A permanent magnet is mounted on the rotor of the motor (not shown), and the rotation of the permanent magnet by tracking of the above-mentioned magnetic field rotates the rotor.

The first embodiment (shown in FIG. 1) will be explained with the assumption that the normal rotation state is obtained when energizing from the left end to the right end of the motor coil L. The assumption is discussed below with respect to the prior art example shown in FIG. 3.

First, it is assumed that the gate signals GS1–GS4, which induce rotation with a 100% duty ratio from the left end to the right end of the motor coil L in the figure, are output from the pre-drive circuit 35 to the FETs Q1–Q4 (gates G1–G4). In this case, high-level gate signals GS1 and GS4 are output to FETS Q1 and Q4, and low level gate signals GS2 and GS3 are output to FETs Q2 and Q3.

At this moment, the voltage for the high level gate signal GS1 to FET Q1 is applied up to a prescribed level that exceeds the voltage of the direct current power source +B, setting FET Q1 to ON. The high-level gate signal GS4 is provided to FET Q4 with a voltage level that remains sufficient to set FET Q4 to ON.

Meanwhile, since low level gate signals GS2 and GS3 are output to FETs Q2 and Q3, FETs Q2 and Q3 are all in the OFF state.

Therefore, at each high level period of gate signals GS1 and GS4 to FETs Q1 and Q4, the current from the direct current power source +B flows through the following path: diode D1→Q1 (between the drain and the source)→motor coil L→FET Q4 (between the drain and the source)→ground.

The rise and fall of the gate signals GS1 and GS4 of FETs Q1 and Q4 are always simultaneous as long as the duty ratio is set to 100%, and the motor (rotor) rotates at maximum speed.

Next, to perform rotation in case the duty ratio is decreased to less than 100%, for example to 50%, regarding only the falling timing of the gate signal GS 4 to FET Q4, the time point is earlier by only ½, compared to that at 100% described above.

Accordingly, if the duty ratio is only 50%, the amount of time the current flows through the direct current power source +B to the diode D1→FET Q1→motor coil L→FET Q4→ground, is half that at 100% described above, and the motor rotates at ½ the maximum speed.

During the period when FET Q1 is ON, which exceeds the period during which FET Q4 is ON, that is, during the period when only FET Q1 is ON and FET Q4 is OFF, the power source current I2 from the motor coil L passes through the parasite diode of FET Q2 (or Q1) and is absorbed by the electrolytic capacitor group 31 (4 electrolytic capacitors EC) (see broken arrow I2). The electric charges absorbed by the electrolytic capacitor group 31 are discharged when FET Q2 is on. At that time, the diode D1 prevents the power source current from the motor coil L from flowing on the side of the direct current power source +B (reverse current prevention).

In case high level gate signals GS2 and GS3 and low level gate signals GS1 and GS4 are output respectively, to FETs Q2 and Q3 and to FETs Q1 and Q4, FETs Q2 and Q3 are set to ON, and the motor coil L is energized from the right end to the left end in the figure. Accordingly, FETs Q2 and Q3 energize the motor coil L with a duty ratio based on the gate signals GS2 and GS3, rotating the motor in reverse.

As described above, when the duty ratio is set to less than 100%, a period during which FET Q1 (or Q2) only is ON and FET Q4 (or Q3) is OFF occurs. During this period, the power source current I2 from the motor coil L passes through the parasite diode of FET Q2 (or Q1) and is absorbed by the electrolytic capacitor group 31 (see broken arrow I2). However, the problem associated with this occurrence was that a great amount of heat was generated from FET Q2 (or Q1), especially from its parasite diode.

In addition, when the electrolytic capacitor group 31 fails, for example when one of the electrolytic capacitor EC is short-circuited, a destruction of the circuit occurs. Each electrolytic capacitor EC constituting the electrolytic capacitor group 31 has a short lifetime compared to other components, and failures are easily provoked. In addition, since the electrolytic capacitor group 31 has a short lifetime, this would cause the lifetime of the device circuit to be shortened.

There was an additional problem that, compared to other components, the electrolytic capacitors EC occupy a large space on the component mounting printed board (not shown). Consequently, the electrolytic capacitor group 31 that is formed from these electrolytic capacitors EC occupies a significant amount of space on the printed board.

In addition, when such large space occupying electrolytic capacitors EC or electrolytic capacitor group 31 is mounted together with FETs Q1–Q4 on a printed board with a limited size, dissipation of the heat from FETs Q1–Q4 is prevented. Therefore, in order to increase the efficiency of heat dissipation, radiators, or fan motors, for example, had to be mounted increasing the cost significantly.

SUMMARY OF THE INVENTION

The present invention was conceived to solve the problems of the prior art described above and its object is to provide a brushless direct current monophase motor drive circuit that can decrease the heat generation from the switching elements on the power source side, perform absorption of the current flowing back in the direction of the switching elements on the power source side when the duty ratio is set to less than 100% without using an electrolytic capacitor group that causes a shortening of the motor lifetime, and solve various problems caused by the use of an electrolytic capacitor group.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION

In the following, embodiments of the invention will be described with reference to the drawings.

Figure 1:
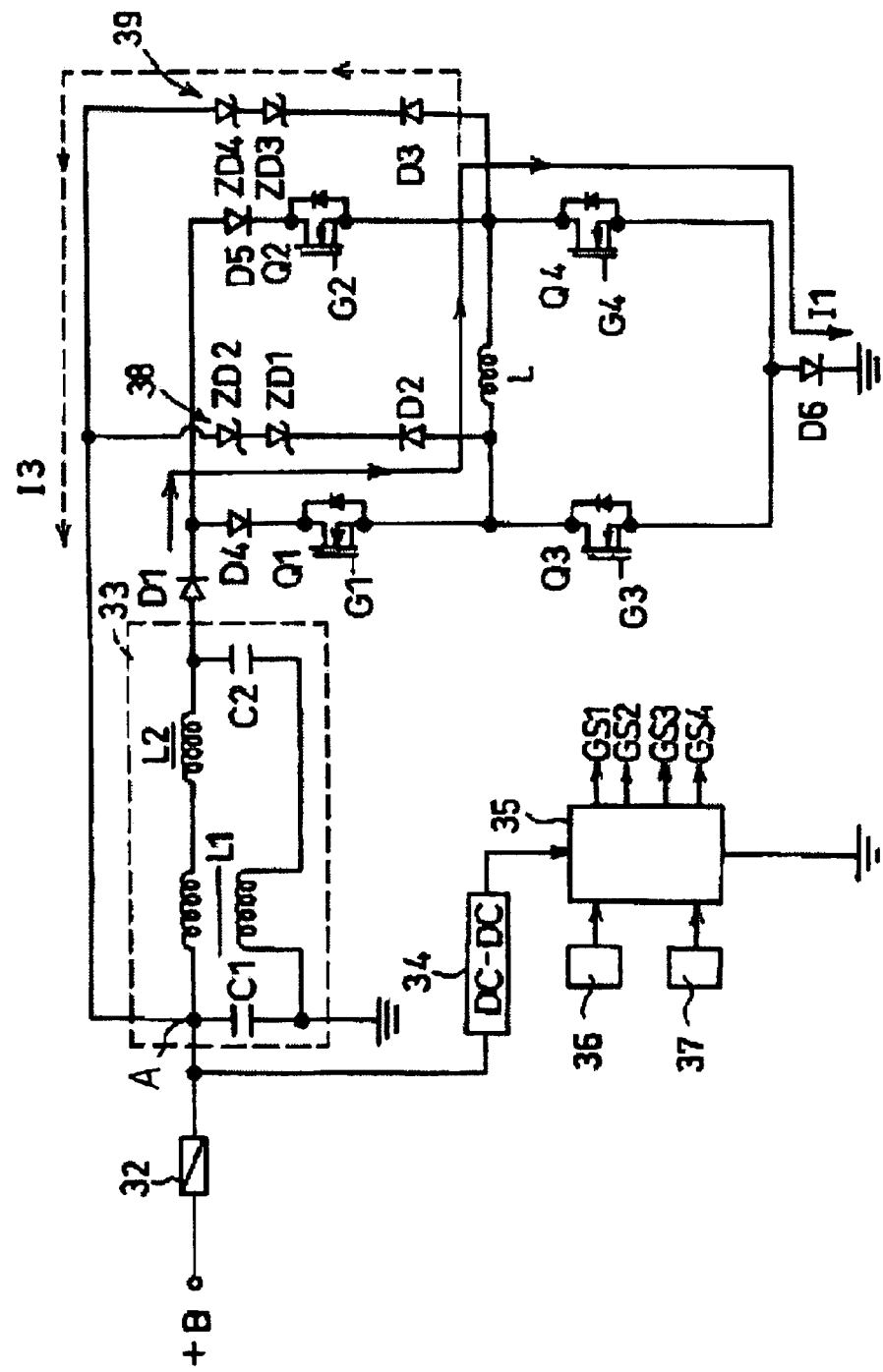
FIG. 1 is a diagram showing one embodiment of the circuit of the present invention.

One embodiment of the brushless direct current monophase motor drive circuit according to the present invention is shown in FIG. 1.

In this figure, +B represents the direct current power source to drive a brushless direct current monophasic motor coil (motor coil) L.

The drive circuit is constituted by mounting 4 switching elements, here, MOS type power FETs (field-effect transistors) Q1–Q4, diodes D1, D4, and D5 for reverse current prevention, a diode D6 for reverse connection (power source reverse polarity connection) protection, and current back flow electrical paths 38 and 39.

In this case, the MOS type power FETs Q1–Q4 can be divided into 2 sets of serially connected switching element assemblies (a first serially connected assembly consisting of FETs Q1 and Q4, and a second serially connected assembly consisting of FETs Q2 and Q3), each one being connected between the direct current power source +B and the ground in the forward direction. The motor coil, which is the target of the drive, is connected between the connection point of FETs Q1 and Q4 constituting the first serially connected assembly and the connection point of FETs Q2 and Q3 constituting the second serially connected assembly. The ON/OFF of each of the FETs Q1–Q4 is controlled by the gate signals (pulse signals) GS1–GS4 from the pre-drive circuit described later, supplied through their gates G1–G4.

The diode D1 is connected in the forward direction with respect to the direct current power source +B, between the direct current power source +B and, the above mentioned first and second serially connected assemblies Q1, Q4 and Q2, Q3. The diode D4 is connected between the diode D1 and FETQ1, and diode D5 is connected between D1 and FETQ2, in the opposite polarity with respect to the respective parasite diode of FET Q1 and Q2 (in the forward direction with respect to the direct current power source +B). Diode D6 is connected between the ground and the above mentioned first and second serially connected assemblies Q1, Q4 and Q2, Q3 in the forward direction with respect to the direct current power source +B. In addition, in the circuit of the present invention, diode D1 may be omitted due to the presence of diodes D4 and D5 with the same polarity.

The current back flow electrical path 38 is equipped with a serial connection circuit consisting of a diode D2 in the forward direction and a serial assembly of Zener diodes ZD1 and ZD2 in the opposite direction, when looking at the side of the direct current power source +B from the end of the motor coil L.

This current back flow electrical path 38 is connected between Point A in FIG. 1 and the connection point between the FETs Q1, Q4 and the motor coil L. Point A in the Figure is located at a junction between the direct current power source +B, through fuse 32, and capacitor C1 which is connected to the ground and constitutes part of filter circuit 33, as described further below.

The current back flow electrical path 39 is equipped with a serial connection circuit consisting of a diode D3 in the forward direction and a serial assembly of Zener diodes ZD3 and ZD4 in the opposite direction, when looking at the side of the direct current power source +B from the end of the motor coil L.

This current back flow electrical path 39 is connected between Point A in FIG. 1 and the connection point between the FETs Q2, Q3 and the motor coil L. Point A in the Figure is located at a junction between the direct current power source +B through fuse 32 and capacitor C1 which is connected to the ground and constitutes part of filter circuit 33, as described further below.

The fuse 32 is provided to protect the circuit from a large current, and a filter circuit 33 is provided to eliminate electrical noises such as conduction noises and radiation noises. In this case, the filter circuit 33 is constituted by mounting capacitors C1 and C2, and coils L1 and L2, in which the input end is connected to the direct current power source +B through the above mentioned fuse 32, and the output end is connected to the anode of the above mentioned diode D1. The DC—DC converter 34 is a voltage conversion circuit that supplies a direct current power source, which is below the voltage of the direct current source +B, to a pre-drive circuit 35.

The pre-drive circuit 35 is a circuit that receives signals from a motor rotation position detector 36 and a duty ratio controller 37 in PWM (pulse width modulation), supplies gate signals GS1–GS4 to the above mentioned FETs Q1–Q4 corresponding to the duty ratio set with the duty ratio controller 37, and controls their ON/OFF states. In addition, between each gate G1–G4 of the pre-drive circuit 35 and the FETs Q1–Q4, suitable gate resistances (not shown) are inserted.

The above mentioned motor coil L is mounted on the stator of the motor (not shown) and energized by the FETs Q1–Q4 with a prescribed ON/OFF timing corresponding to the above mentioned duty ratio, to generate a dynamic magnetic field (rotating magnetic field). A permanent magnet is mounted on the rotor of the motor (not shown), and the rotation of the permanent magnet by tracking of the above mentioned magnetic field rotates the rotor.

The first embodiment as shown in FIG. 1 will be explained with the assumption that the normal rotation state (the ventilation state, in case the present motor is applied to a fan motor) is obtained when energizing from the left end to the right end of the motor coil L in FIG. 1.

First, it is assumed that the gate signals GS1–GS4, which induce rotation with a 100% duty ratio, in other words at the maximum speed setting, from the left end to the right end of the motor coil L in the figure, are output from the pre-drive circuit 35 to the FETs Q1–Q4 (gates G1–G4). In this case, high level gate signals GS1 and GS4 are output to FETs Q1 and Q4, and low level gate signals GS2 and GS3 are output to FETs Q2 and Q3, respectively.

At this moment, the voltage for the high level gate signal GS1 to FET Q1 is applied up to a prescribed level that exceeds the voltage of the direct current power source +B, setting FET Q1 to ON. The high level gate signal GS4 to FET Q4 is provided to FET Q4 with a voltage level that is lower than the voltage of the direct current power source +B and remains sufficient to set FET Q4 to ON.

Meanwhile, since low level gate signals GS2 and GS3 are output to FETs Q2 and Q3, FETs Q2 and Q3 are all in the OFF state.

Therefore, at each high level period of the gate signals GS1 and GS4 to FETs Q1 and Q4, the current from the direct current power source +B flows through the following path: diode D1→Q1 (between the drain and the source)→motor coil L→FET Q4 (between the drain and the source) →ground.

The rise and fall of the gate signals GS1 and GS4 of FETs Q1 and Q4 are always simultaneous as long as the duty ratio is set to 100%, and the motor (rotor) rotates at maximum speed.

In the case where the present motor is applied to a fan motor, a maximum amount of heat from inside the housing in which it is mounted is sent and evacuated to the outside.

In addition, the timing of the rise and fall of the gate signals GS1 and GS4 to FETs Q1 and Q4 follows the rotational position signal of the motor (including the rotor and permanent magnet) detected with the motor rotational position detector 36.

Next, to perform rotation in case the duty ratio is decreased to less than 100%, for example to 50%, regarding only the falling timing of the gate signal GS 4 to FET Q4, the time point is earlier by only ½, compared to that at 100% described above. That is, without changing the high level period for the gate signal GS1 to FET Q1, the high level period for the gate signal GS4 to FET Q4 is decreased by half.

Accordingly, if the duty ratio is only 50%, the amount of time the current flows through the direct current power source +B to the diode D1→FET Q1→motor coil L→FET→Q4 ground, is half that at 100% described above the motor rotates at ½ the maximum speed.

During the period when FET Q1 is ON, which exceeds the period during which FET Q4 is ON, that is, during the period when only FET Q1 is ON and FET Q4 is OFF, the power source current I3 from the motor coil L passes through the current back flow electrical path 39 and is absorbed by the capacitor C1 constituting the filter circuit 33.

In other words, in the circuit of the present invention, the power source current from the motor coil L during the OFF period of the switching element on the ground side, here, the FET Q4, which switches from ON to OFF when the duty ratio is less than 100%, is not flown back via the parasite diode of FET Q2. Instead, it passes through the Zener diodes ZD1 and ZD2 and gets absorbed by capacitor C1. Accordingly, the problem of high heat being generated from the parasite diode due to electrical conduction during the above mentioned OFF period is eliminated. Therefore, costs associated with elevating the heat dissipation efficiency, such as radiators or fan motors, is suppressed.

Figure 3:
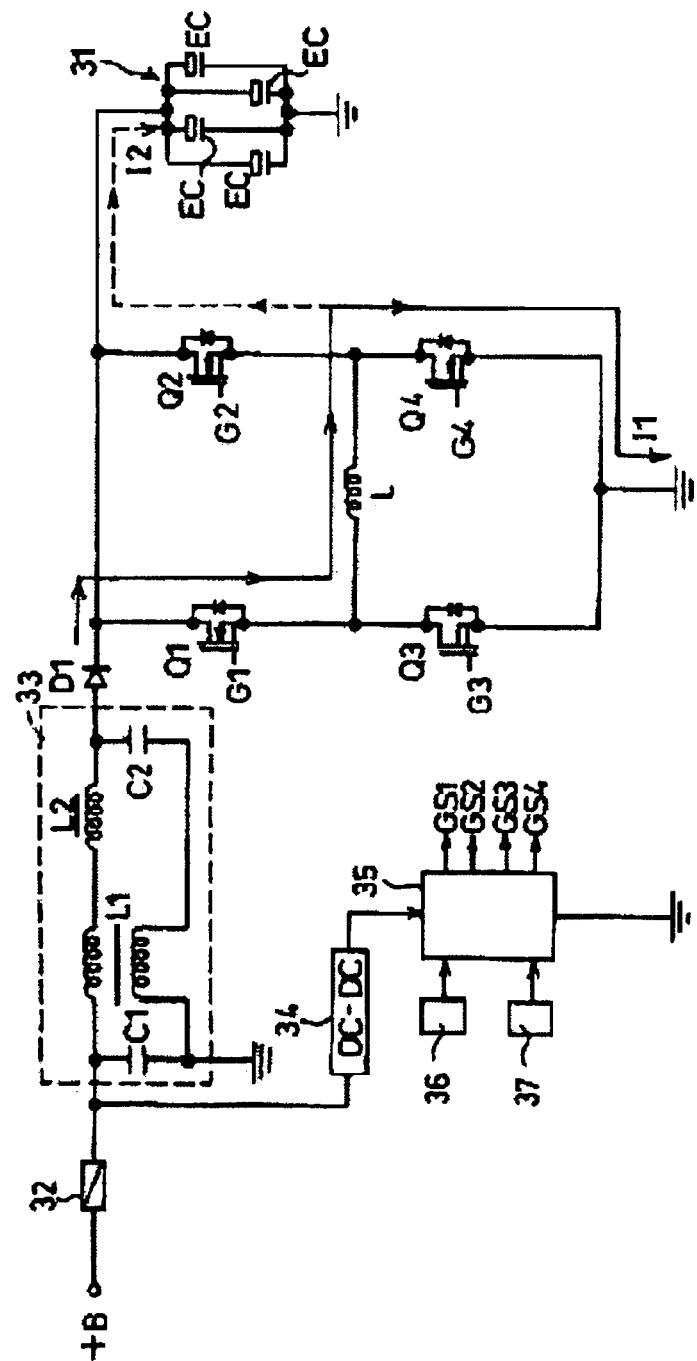
FIG. 3 is a diagram showing a circuit of the prior art.

In addition, in the present invention, the electrolytic capacitor group 31 (see FIG. 3) of the prior art is not used since capacitor C1 of filter circuit 33 is used to absorb current I3 from the motor coil L. Thus, problems caused by the use of the electrolytic capacitor group 31 are also eliminated, and the following effect can be exhibited. Shortening of the lifetime of the electrolytic capacitor group which would lead to shortening of the lifetime of the drive circuit can be prevented. In addition, since such large space occupying electrolytic capacitors EC or electrolytic capacitor group 31 is not mounted together with FETs Q1–Q4, dissipation of the heat from FETs Q1–Q4 is not prevented.

In the example shown in the figure, the current back flow electrical path 39 is provided with a diode D3 in the forward direction looking from the side of the motor coil L to the side of the direct current power source +B. Therefore, it can stop current from flowing back from the power source side, that is, from the point A to the motor coil L (direct influx of direct current power source +B to motor coil L). Accordingly, the above-mentioned back flow of power source current during the period when FET Q4 is OFF due to the application of tension to the current back flow electrical path 39 shown in the figure, may be realized without failure with a simple configuration.

In addition, the current back flow electrical path 39 is provided with Zener diodes ZD3 and ZD4 in the reverse direction looking from the left coil end on the power source current output side of the motor coil L to the side of the direct current power source +B; therefore, setting of the maximum peak voltage at the left coil end on the same power source current output side is possible. Accordingly, components such as the diode D3 and the capacitor C1 can be protected from over current. Additionally, the above mentioned maximum peak voltage can be increased by the number of serially connected Zener diodes, thereby protecting a greater number of electrical components from over current.

Further, in the figure, diode D5 is connected between diode D1 and FETQ2, in the opposite polarity to the parasite diode of FET Q2 but in the forward direction with respect to the direct current power source +B. Therefore, the current that should normally pass through the current back flow electric path 39 and be absorbed by capacitor C1, can be prevented from passing through the parasite diode of Q2 and going over onto the side of the direct current power source +B of FETs Q1 and Q2. Accordingly, high heat generation from this parasite diode can be eliminated.

In addition, in the example shown in the figure, between the first and second serially connected assemblies Q1, Q4 and Q2, Q4 and the ground, a diode D6 is connected in the forward direction with respect to the direct current power source +B, intended to stop a reverse connection of the direct current power source +B. Therefore, any damages or destruction, of circuit elements due to a reverse connection of the direct current power source +B can be prevented, increasing reliability.

In case high level gate signals GS2 and GS3 and low level gate signals GS1 and GS4, are output respectively to FETs Q2 and Q3 and FETs Q1 and Q4, FETs Q1 and Q4 switch to OFF, and Q2 and Q3 switch ON, such that the motor coil L is energized from the right end to the left end direction in the figure. Accordingly, FETs Q2 and Q3 operate the same way as FETs Q1 and Q4 during normal rotation, energizing motor coil L with a prescribed duty ratio based on the gate signals GS2 and GS3 to FETs Q2 and Q3, and rotating the motor in reverse.

Here, the diode D2, the Zener diodes ZD1 and ZD2, and the diode D4 correspond respectively to the diode D3, the Zener diodes ZD3 and ZD4, and the diode D5. Therefore, also during reverse rotation described above, the same action and effects as the action and effects due to the diode D3, the Zener diodes ZD3 and ZD4, and the diode D5 can be obtained.

Figure 2:
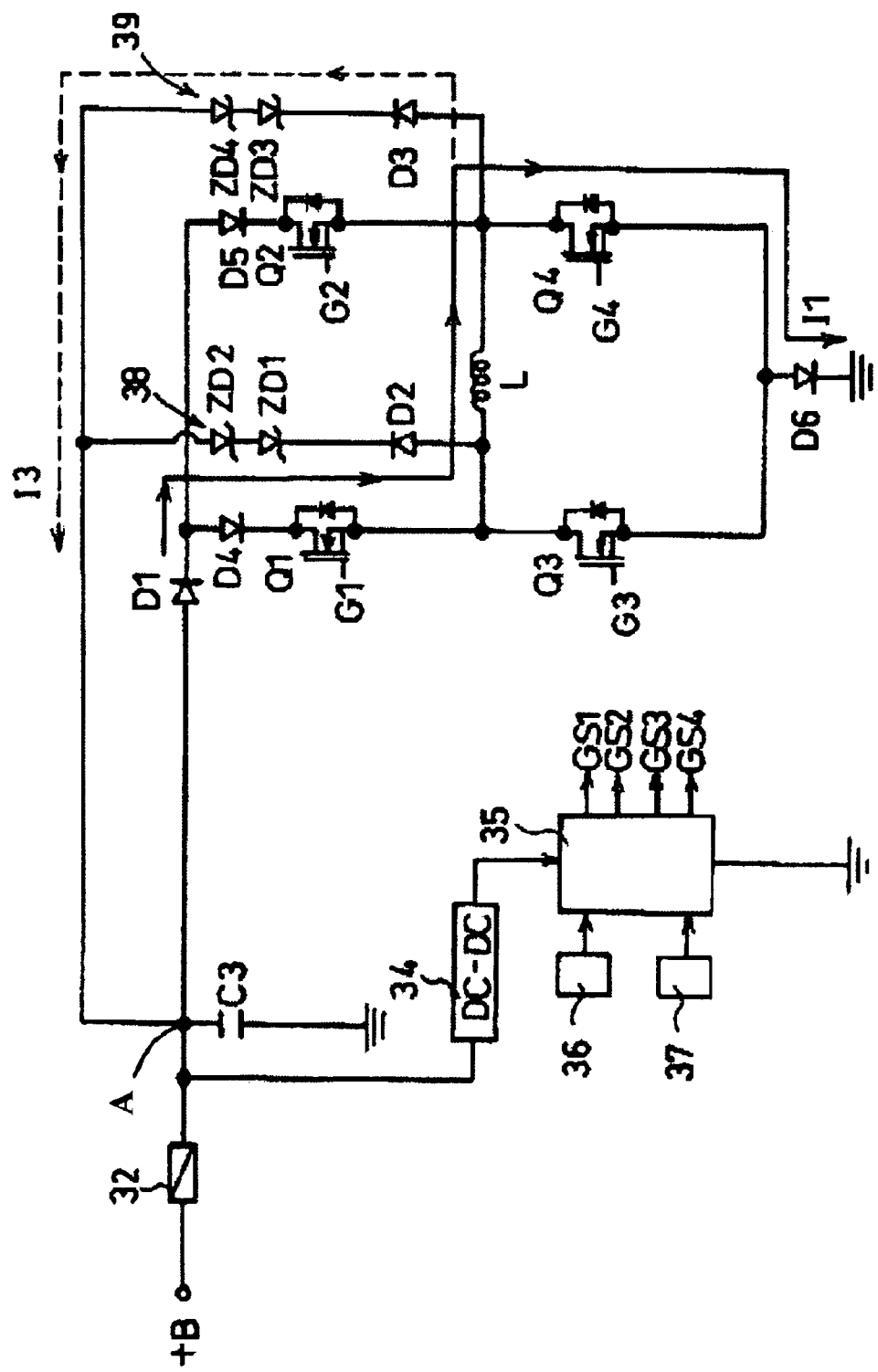
FIG. 2 is a diagram showing another embodiment of the circuit of the present invention.

In another embodiment, the filter circuit in FIG. 1 can be omitted. As shown in FIG. 2, absorption of the back flow current is performed by a capacitor C3 used in combination for noise elimination. The capacitance of the capacitors C1 and C3 is set suitably according to the value of the current I3 or the line of the direct current power source +B or lines that continue it, for example the capacitance of a capacitor (not shown) connected between the power source line and the ground of the power source circuit (not shown) that supplies the direct current power source +B.

In each of the above-mentioned figures, the same numerals represent the same or corresponding parts.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A brushless direct current motor drive circuit comprising:
   a first serially connected motor coil energizing circuit;
   a second serially connected motor coil energizing circuit;
   a first serially connected feedback circuit;
   a pre-drive circuit;
   a position sensor; and
   a duty ratio controller;
   wherein said first serially connected motor coil energizing circuit further comprises:
   a direct current power supply;
   a first diode;
   a first switching means;
   a motor coil having a first end and a second end;
   a second switching means; and
   a ground;
   wherein said first switching means is connected to said first end of said motor coil, and said second switching means is connected to said second end of said motor coil;
   wherein said first serially connected feedback circuit further comprises:
   a second diode;
   a capacitor; and
   said ground;
   wherein said first serially connected feedback circuit connects said second end of said motor coil to said ground through said capacitor; wherein said capacitor is also connected to said power supply;
   wherein said second serially connected motor coil energizing circuit further comprises:
   said direct current power supply;
   a third diode;
   a third switching means;
   said motor coil;
   a fourth switching means; and
   said around;
   wherein said third switching means is connected to said first end of said motor coil, and said fourth switching means is connected to said second end of said motor coil;
   wherein said second serially connected feedback circuit further comprises:
   a fourth diode;
   said capacitor; and
   said ground;
   wherein said second serially connected feedback circuit connects said first end of said motor coil to said ground through said capacitor;
   wherein said pre-drive circuit receives inputs from said position sensor and said duty ratio controller; and
   wherein said pre-drive circuit turns said first switching means, second switching means, third switching means and fourth switching means on and off;
   wherein said first serially connected feedback circuit further comprises a first zener diode and said second serially connected feedback circuit further comprises a second zener diode, said first zener diode and second zener diode being configured to reduce heat by causing a current from said power source to be absorbed by said capacitor.

2. A drive circuit according to claim 1 further comprising:
   a filter circuit.